US012571773B2

(12) United States Patent
Harada

(10) Patent No.: US 12,571,773 B2
(45) Date of Patent: Mar. 10, 2026

(54) METHOD OF EVALUATING TANK, AND EVALUATION DEVICE FOR TANK

(71) Applicant: TOYOTA JIDOSHA KABUSHIKI KAISHA, Toyota (JP)

(72) Inventor: Yuta Harada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 425 days.

(21) Appl. No.: 18/316,336

(22) Filed: May 12, 2023

(65) Prior Publication Data

US 2023/0384266 A1      Nov. 30, 2023

(30) Foreign Application Priority Data

May 27, 2022      (JP) ................................. 2022-086723
Dec. 23, 2022      (JP) ................................. 2022-206376

(51) Int. Cl.
*G01N 29/14*          (2006.01)
*G01N 29/22*          (2006.01)

(52) U.S. Cl.
CPC ........... *G01N 29/14* (2013.01); *G01N 29/227* (2013.01); *G01N 2291/2695* (2013.01)

(58) Field of Classification Search
None
See application file for complete search history.

(56) References Cited

U.S. PATENT DOCUMENTS

| | | | |
|---|---|---|---|
| 6,240,769 B1 * | 6/2001 | Heuft ........................ | F26B 3/28 |
| | | | 73/49.3 |
| 2010/0107765 A1 | 5/2010 | Murakami et al. | |
| 2020/0309741 A1 * | 10/2020 | Giunta ................ | G01M 5/0025 |
| 2021/0301980 A1 | 9/2021 | Hori et al. | |

FOREIGN PATENT DOCUMENTS

| | | |
|---|---|---|
| JP | 2021162441 A | 10/2021 |
| WO | 2009008515 A1 | 1/2009 |
| WO | 2014057987 A1 | 4/2014 |

* cited by examiner

*Primary Examiner* — Suman K Nath
(74) *Attorney, Agent, or Firm* — Hunton Andrews Kurth LLP

(57)          ABSTRACT

A high-pressure tank is detected to rupture before the rupture of the tank with high accuracy. The pressure when the indicator obtained based on measured acoustic emission or sound is at least a threshold value is defined as a pressure just before a rupture.

4 Claims, 15 Drawing Sheets time (sec)   rupture

METHOD OF EVALUATING TANK, AND EVALUATION DEVICE FOR TANK

This application claims priority under 35 USC 119 on Japanese patent application No. 2022-086723 filed in Japan on May 27, 2022, and Japanese patent application No. 2022-206376 filed in Japan on Dec. 23, 2022, the entire contents of which are hereby incorporated by reference.

FIELD

The present disclosure relates to evaluation of tanks.

BACKGROUND

A high-pressure tank for storing hydrogen that is to be used as a fuel for fuel cell electric vehicles has a liner that forms the space in the tank. A stiffener layer is formed over the liner through the provision of a fiber layer impregnated with a resin for the outer periphery of this liner. According to this, the high strength of the high-pressure tank is achieved.

Patent literature 1 discloses the method of evaluating a high-pressure tank, wherein AE (acoustic emission) signals are measured, and the sign of the rupture of the tank is detected based on the hit rate indicating the change in the count of the signals over time. Here, when the hit rate cannot increase any more is determined to be the sign of the rupture of the tank.

CITATION LIST

Patent Literature

Patent Literature 1: WO 2009/008515 A1

SUMMARY

Technical Problem

The sign of the rupture of a high-pressure tank can be detected of course by the method of patent literature 1. However, it is necessary to be able to determine the sign of the rupture with higher accuracy because it is difficult to reach the state where some types (e.g., sizes) of high-pressure tank cannot microcrack anymore, so that it is infrequent that the hit rate cannot increase any more.

The present disclosure was made with these actual circumstances in view, and an object thereof is to provide an evaluation method by which a high-pressure tank can be detected to rupture before the rupture with high accuracy. The present disclosure is also provided with an evaluation device for this.

Solution to Problem

The present application discloses a method of evaluating a tank, the method comprising: measuring acoustic emission while applying pressure to the tank; and calculating cumulative acoustic emission energy based on the measured acoustic emission, wherein a pressure when an increasing rate of the cumulative acoustic emission energy is at least a certain value is defined as a pressure just before a rupture.

The present application also discloses a method of evaluating a tank, the method comprising: measuring acoustic emission while applying pressure to the tank; and calculating waveform duration based on the measured acoustic emission, wherein a pressure when an increasing rate of the waveform duration is at least a certain value is defined as a pressure just before a rupture.

The present application also discloses a method of evaluating a tank, the method comprising: measuring acoustic emission while applying pressure to the tank; and calculating a time integral of an acoustic emission wave based on the measured acoustic emission, wherein a pressure when the time integral of an acoustic emission wave is at least a threshold value is defined as a pressure just before a rupture. Here, the threshold value may be $1 \times 10^8$ (eU) to $10 \times 10^8$ (eU).

The present application also discloses a method of evaluating a tank, the method comprising: measuring sound while applying pressure to the tank, wherein a pressure when at least one of amplitude and frequency of the sound is at least a threshold value is defined as a pressure just before a rupture.

Further, in this method, a pressure obtained by adding a predetermined value to the pressure just before a rupture may be defined as an estimated burst pressure.

The present application also discloses an evaluation device for a tank, the evaluation device comprising: an acoustic emission sensor arranged on the tank; and an arithmetic unit acquiring acoustic emission data from the acoustic emission sensor to carry out an operation, wherein the arithmetic unit calculates cumulative acoustic emission energy based on the acoustic emission data to carry out the operation such that a pressure when an increasing rate of the cumulative acoustic emission energy is at least a certain value is defined as a pressure just before a rupture.

The present application also discloses an evaluation device for a tank, the evaluation device comprising: an acoustic emission sensor arranged on the tank; and an arithmetic unit acquiring acoustic emission data from the acoustic emission sensor to carry out an operation, wherein the arithmetic unit calculates waveform duration based on the acoustic emission data to carry out the operation such that a pressure when an increasing rate of the waveform duration is at least a certain value is defined as a pressure just before a rupture.

The present application also discloses an evaluation device for a tank, the evaluation device comprising: an acoustic emission sensor arranged on the tank; and an arithmetic unit acquiring acoustic emission data from the acoustic emission sensor to carry out an operation, wherein the arithmetic unit calculates a time integral of an acoustic emission wave based on the acoustic emission data to carry out the operation such that a pressure when the time integral of an acoustic emission wave is at least a threshold value is defined as a pressure just before a rupture. Here, the threshold value may be $1 \times 10^8$ (eU) to $10 \times 10^8$ (eU).

The present application also discloses an evaluation device for a tank, the evaluation device comprising: a sound collector arranged over the tank; and an arithmetic unit acquiring sound data from the sound collector to carry out an operation, wherein the arithmetic unit carries out the operation such that based on the sound data, a pressure when at least one of amplitude and frequency of the sound is at least a threshold value is defined as a pressure just before a rupture.

In the arithmetic unit in the evaluation device, a pressure obtained by adding a predetermined value to the pressure just before a rupture may be defined as an estimated burst pressure.

Advantageous Effects

According to the present disclosure, a tank can be detected to rupture before the rupture with high accuracy.

DESCRIPTION OF EMBODIMENTS

1. Structure of High-Pressure Tank

Figure 1:
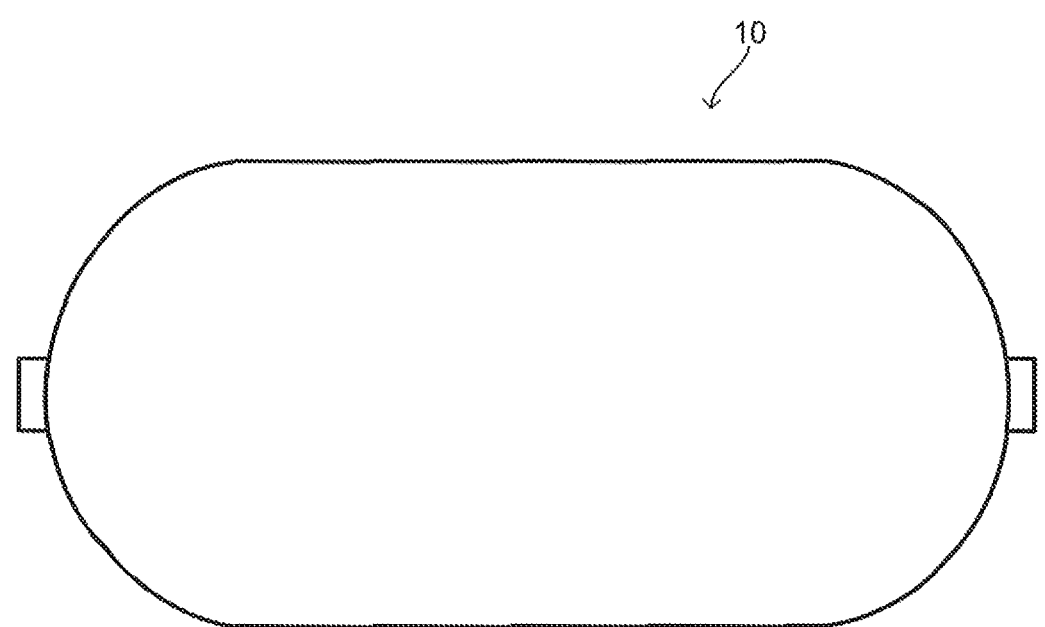
FIG. 1 is a schematic external view of a high-pressure tank 10.
Figure 2:
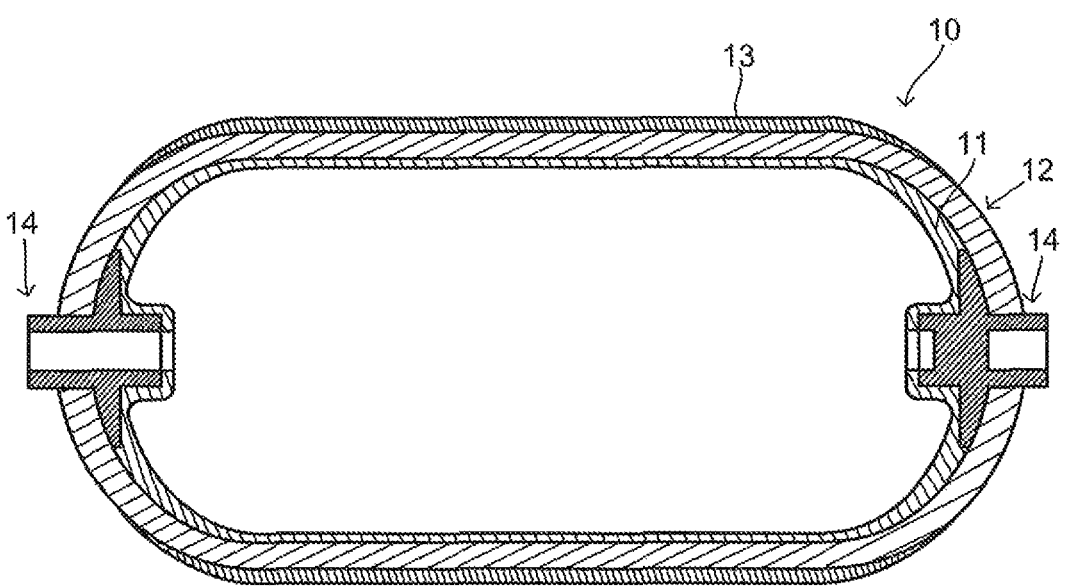
FIG. 2 is a schematic cross-sectional view of the high-pressure tank 10.

FIG. 1 schematically shows the external appearance of a high-pressure tank 10 according to one embodiment, and FIG. 2 schematically shows the cross section of the high-pressure tank 10 taken along the axis of the tank. As can be seen from these drawings, in this embodiment, the high-pressure tank 10 includes a liner 11, a stiffener layer 12, a protective layer 13, and mouthpieces 14. The structure of each of them will be described below.

1.1. Liner

The liner 11 is a hollow member defining the space inside the high-pressure tank 10. The liner 11 can be formed of any known material as long as the material enables any matter housed in the space inside the liner 11 (such as hydrogen) to be kept without the leakage of the housed matter. Specifically, for example, the liner 11 is formed of a nylon resin, a polyethylene synthetic resin, or a metal such as stainless steel and aluminum.

The thickness of the liner 11 is not particularly limited, and is preferably 0.5 mm to 1.0 mm.

1.2. Stiffener Layer

The stiffener layer 12 is formed by layering plural layers of fiber, and includes a cured resin impregnated into this fiber. The layers of fiber are formed by winding a fiber bundle around the outer surface of the liner 11 many times until the layers of the wound fiber have a predetermined thickness.

The thickness of the stiffener layer 12 is not particularly limited because determined by necessary strength, and is approximately 10 mm to 30 mm.

A carbon fiber is used for the fiber bundle of the stiffener layer 12. The fiber bundle is a belt-shaped bundle of a carbon fiber and has a predetermined cross-sectional shape (e.g., rectangular cross section). The fiber bundle is not particularly limited, but the cross-sectional shape thereof is a rectangle of approximately 6 mm to 10 mm in width and 0.1 mm to 0.15 mm in thickness. The quantity of the carbon fiber in the fiber bundle is not particularly limited, either. For example, the fiber bundle is formed of approximately 36000 strands of the carbon fiber.

The cured resin impregnated into the fiber in the stiffener layer 12 is not particularly limited as long as enabling the strength of the fiber to increase. Examples of this resin include thermosetting resins that cure by heat, such as epoxy resins and unsaturated polyester resins each including an amine or anhydride-based curing accelerator and a rubber-based reinforcing agent. Examples of the resin also include resin compositions that contain an epoxy resin as a main agent, and that cure when a curing agent is mixed with the epoxy resin. According to this, the resin automatically cures due to the permeation of such a resin composition that is the mixture of a main agent and a curing agent through the fiber layers before the resin composition cures after the main agent and the curing agent were mixed.

1.3. Protective Layer

The protective layer 13 is a layer arranged on the outer periphery of the stiffener layer 12 if necessary. For example, a glass fiber is wound, and the wound fiber is impregnated with a resin to form the protective layer 13. The resin impregnated into the glass fiber can be considered the same as in the stiffener layer 12. According to this, the high-pressure tank 10 can be given impact resistance.

The thickness of the protective layer 13 is not particularly limited, and can be approximately 1.0 mm to 2.0 mm.

1.4. Mouthpiece

The mouthpieces 14 are members fitted to two opening ends of the liner 11, respectively. One of the mouthpieces 14 functions as an opening via which the inside and the outside of the high-pressure tank 10 communicate with each other, and functions as a fitting for fitting a pipe and/or a valve to the high-pressure tank 10.

When the liner 11 is formed from a metal, it is not necessary to separately provide any mouthpiece as long as the same shape as the mouthpiece is formed continuously from the liner 11.

2. Evaluation by Acoustic Emission 2.1. Evaluation Device

Figure 3:
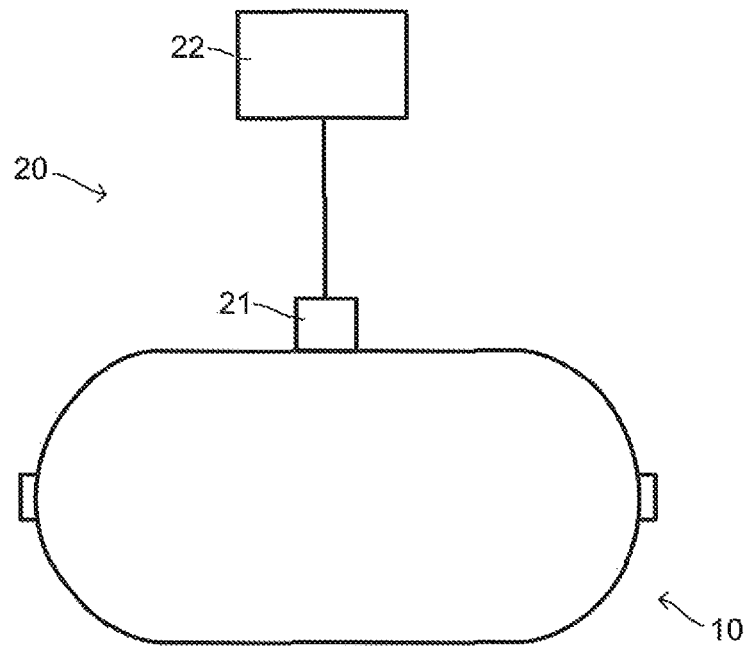
FIG. 3 illustrates the structure of an evaluation device 20.

An evaluation device 20 according to one example will be described with reference to drawings. FIG. 3 schematically shows the structure of the evaluation device 20 together with the high-pressure tank 10 to be evaluated. The evaluation device 20 is a device that detects the high-pressure tank 10 to rupture following the increase in the internal pressure of the tank to give information on the sign before the rupture. Here, it is demanded that the evaluation device detect the sign before the rupture when the pressure is as close as possible to the pressure that causes the rupture. It is relatively easy to determine the sign on the safer side when the sign of the rupture is detected before the rupture. The determination on the rupture on too safer a side, however, prevents the relation between the rupture and the internal pressure of a high-pressure tank, including a fracture morphology, and the estimation of the burst pressure without the rupture, from being properly grasped. According to the present embodiment, the sign of the rupture can be detected before the rupture when the pressure is close to the pressure that causes the rupture (at most several megapascals lower than the burst pressure).

In the evaluation device 20, the sign of the rupture following the filling of the high-pressure tank 10 with a fluid (e.g., hydrogen) is detected by acoustic emission (AE). AE is the phenomenon of radiation of elastic waves that occurs during the process where strain energy accumulated in a material is released following the deformation of the material when force is applied to the material. Such an elastic wave is called an AE wave. That is, during the process of filling the high-pressure tank 10 with a fluid, the high-pressure tank 10 deforms, and AE waves are generated following this deformation. In the evaluation device 20, the sign of the rupture of the high-pressure tank 10 is obtained through the detection and processing of such AE waves.

Therefore, the evaluation device 20 includes an acoustic emission sensor (AE sensor) 21 that detects the acoustic emission (AE) generated from the high-pressure tank 10 to be evaluated, and an arithmetic unit 22 that acquires data (digital signals) obtained in the AE sensor 21 to determine whether the rupture will be caused.

2.1.1. AE Sensor

The AE sensor 21 is a sensor that is attached to the surface of the high-pressure tank 10, and that detects the AE waves generated in the high-pressure tank 10. A known sensor can be used as the AE sensor 21. For example, the AE sensor 21 is configured by including a piezoelectric element.

The arrangement of the AE sensor 21 on the high-pressure tank 10 is not particularly limited as long as the AE sensor 21 can effectively detect the AE waves generated in the high-pressure tank 10. For such detection, the AE sensor(s) in necessary number is/are required to be applied at some position(s). For example, when such detection can be performed by one AE sensor 21, the AE sensor 21 is arranged at the center of the surface of the high-pressure tank 10; and when the length of the high-pressure tank 10 (the distance between the two mouthpieces 14) is more than 1.5 m, plural AE sensors 21 are applied according to the size of the tank 10.

2.1.2. Arithmetic Unit

Figure 4:
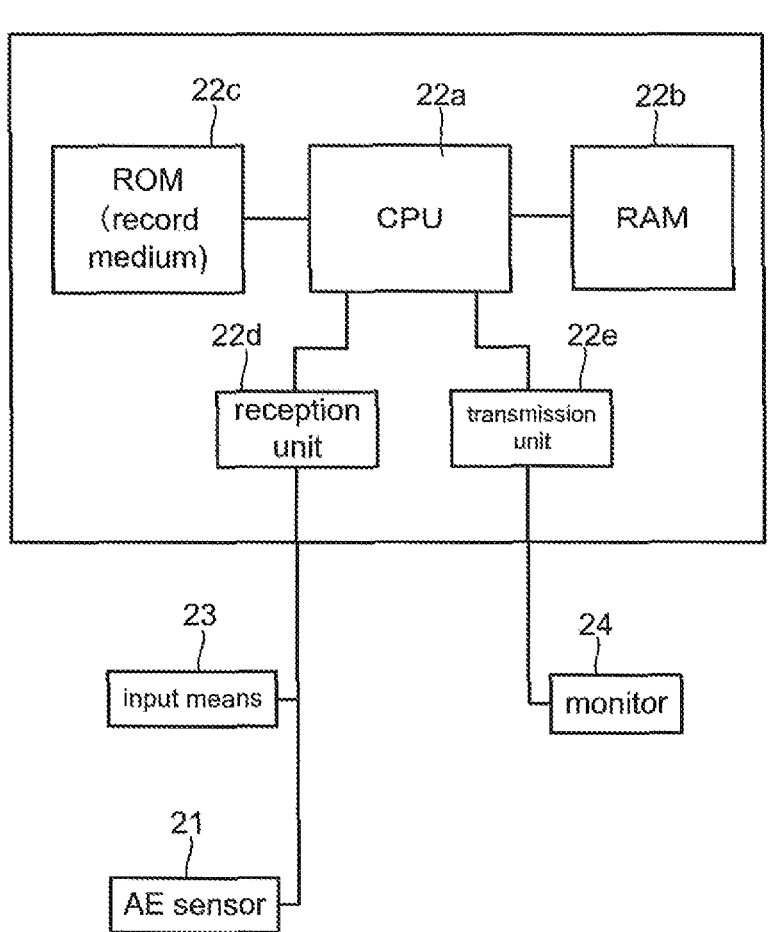
FIG. 4 illustrates the structure of an arithmetic unit 22.

The arithmetic unit 22 carries out operations on the digital data on the AE waves detected by the AE sensor 21 to determine the sign of the rupture. As schematically shown in FIG. 4, the arithmetic unit 22 includes a CPU (Central Processing Unit) 22a that is a processor and that carries out operations, a RAM (Random Access Memory) 22b that operates as a work area, a ROM (Read-Only Memory) 22c that operates as a record medium, a reception unit 22d that is an interface via which the arithmetic unit 22 receives data by wire or wireless, and a transmission unit 22e that is an interface via which the arithmetic unit 22 transmits data to the outside by wire or wireless.

Therefore, the arithmetic unit 22 is connected to the AE sensor 21 and other equipment via the reception unit 22d and the transmission unit 22e so as to be able to transmit and receive signals.

In the arithmetic unit 22, the program according to which the data on the AE waves (signals) from the AE sensor 21 is processed and the sign of the rupture is determined is stored. In the evaluation device 20, the CPU 22a, the RAM 22b and the ROM 22c as hardware resources cooperate with the program as a computer program. Specifically, the CPU 22a executes, with the RAM 22b that operates as a work area, computer programs recorded in the ROM 22c; thereby enables various functions including the determination of the sign of the rupture. The data acquired or created by the CPU

22a is stored in the RAM 22b. Programs and various data may be recorded in a record medium separately and optionally provided inside or outside the arithmetic unit 22.

In this embodiment, the arithmetic unit 20 acquires the AE wave data from the AE sensor 21 via the reception unit 22d from the AE sensor 21. Based on the acquired digital data, the arithmetic unit 22 executes the computer program recorded in the ROM 22c and the other optional record medium to carry out an operation while, for example, using a database recorded in the ROM 22c and the other optional record medium, determines the tank to rupture, and records the results in the RAM 22b and the optional record medium. Specific content for the determination on the rupture will be described later. As the results of the determination of the sign of the rupture, necessary information is outputted from the transmission unit 22e on, for example, a monitor 24.

Typically, such an arithmetic unit 22 can be configured by a computer. Accordingly, input means (such as a keyboard and a mouse) 23 for operating the arithmetic unit 22 is connected to the reception unit 22d in the arithmetic unit 22.

2.2. Determination on Rupture

Next, a specific method of determining the tank to rupture will be described. In the following embodiments, the tank is determined to rupture by processing, in the arithmetic unit 22, the AE wave data acquired by the AE sensor 21 as described above. Thus, here, methods of determining the tank to rupture will be described. For the specific execution of these methods, the computer programs having steps corresponding to respective steps of the methods are created, recorded in the ROM 22c of the arithmetic unit 22 and the optional record medium, and executed; thereby, the tank can be determined to rupture. Hereinafter the methods of determining the tank to rupture according to embodiments 1 to 3 will be described. As described above, the computer programs based on any of them are recorded in the ROM 22c of the arithmetic unit 22 and the optional record medium, and thereby, function as one component of the evaluation device 20.

2.2.1. Embodiment 1

Figure 5:
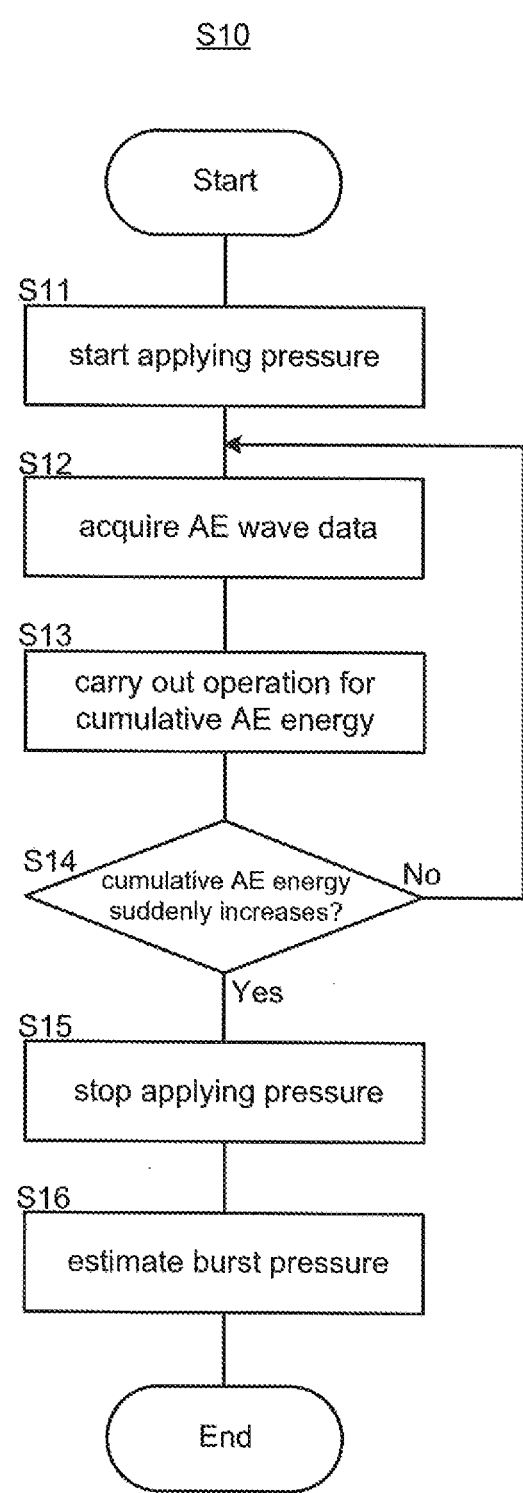
FIG. 5 illustrates an evaluation method S10.

FIG. 5 shows the flow of the method S10 of determining a tank to rupture according to embodiment 1. As can be seen from FIG. 5, the method S10 of determining a tank to rupture according to the present embodiment includes step S11 of starting applying pressure, step S12 of acquiring AE wave data, step S13 of carrying out an operation for cumulative AE energy, step S14 of determining whether the cumulative AE energy rapidly increases, step S15 of stopping applying pressure, and step S16 of estimating a burst pressure. Hereinafter, each of the steps will be described.

2.2.1a. Step of Starting Applying Pressure

Step S11 of starting applying pressure (which may be referred to as "step S11") is the step of starting applying pressure to the inside of a high-pressure tank. The pressure applying means and rate can be appropriately set according to the high-pressure tank to be evaluated. For example, when the high-pressure tank is a hydrogen tank for fuel cells, pressure can be applied by filling the high-pressure tank with hydrogen (or with a fluid other than hydrogen). An example of the pressure applying (rising) rate is a pressure rising rate (0.15 MPa/sec to 0.35 MPa/sec) at a normal hydrogen filling rate.

Pressure is continuously applied from the start of the pressure application in step S11 until step S15 of stopping applying pressure, which will be described later.

2.2.1b. Step of Acquiring AE Wave Data

In step S12 of acquiring AE wave data (which may be referred to as "step S12"), AE wave data is acquired from the high-pressure tank. Specifically, when the evaluation device 20 is used, step S12 is performed by acquiring AE wave data by the arithmetic unit 22 from the AE sensor 21 disposed on the high-pressure tank 10. Here, the intervals at which the AE wave is acquired are not particularly limited. For example, the AE wave data can be acquired at a sampling rate of approximately 40 MHz.

2.2.1c. Step of Carrying Out Operation for Cumulative AE Energy

In step S13 of carrying out an operation for cumulative AE energy (which may be referred to as "step S13"), the operation for acquiring cumulative AE energy is carried out. The cumulative AE energy is the following value.

The acquired AE wave data has an AE waveform, and forms a waveform with (varying) amplitude across the baseline (at repeated irregular cycles). In the AE waveform, one wave is from the point over a setting value to the point under a setting value for set waveform separation time. AE energy is obtained by the area surrounded by the waveform of this one wave and the baseline. The cumulative AE energy is a value obtained by cumulating the values of all the AE energy generated per 0.1 MPa.

In this embodiment, the operation is carried out by Vallen Acquisition from Vallen Systeme GmbH.

2.2.1d. Step of Determining whether Cumulative AE Energy Rapidly Increases

In step S14 of determining whether the cumulative AE energy rapidly increases (which may be referred to as "step S14"), it is determined whether the cumulative AE energy obtained in step S13 rapidly increases. If it is determined that the cumulative AE energy rapidly increases in step S14, Yes is selected and the process proceeds to step S15 of stopping applying pressure. If it is determined that the cumulative energy does not rapidly increase in step S14, the process returns to step S12 to proceed to acquire the AE wave data.

Figure 6:
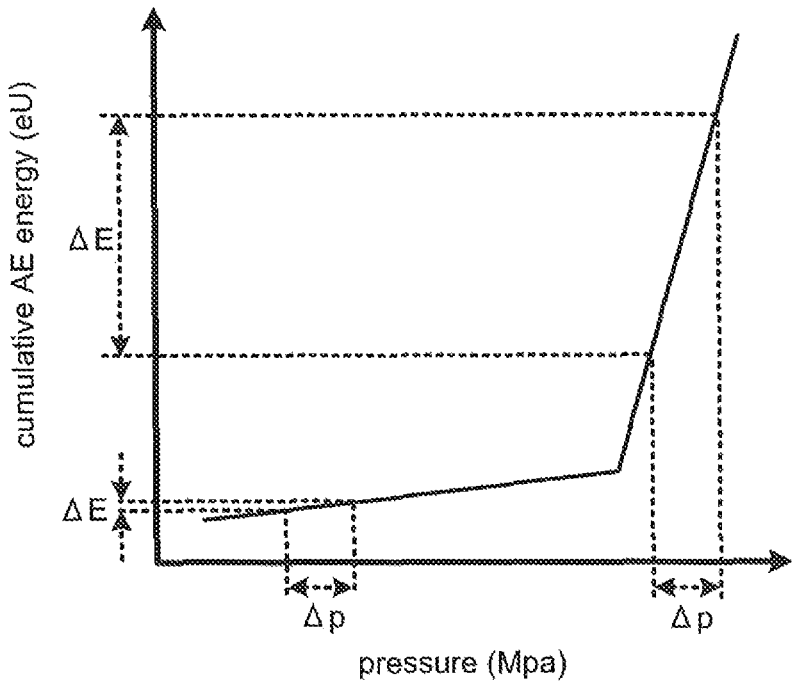
FIG. 6 illustrates the increasing rate of cumulative AE energy.

Whether or not the cumulative AE energy rapidly increases can be determined by whether the increasing rate ($\Delta E/\Delta p$) of the cumulative AE energy, which is the ratio of the increase $\Delta E$ of the cumulative AE energy to the increase $\Delta p$ of the pressure in the high-pressure tank, exceeds a threshold value as schematically shown in FIG. 6. A specific threshold value can be set as appropriate according to, for example, the structure of the high-pressure tank. For example, the threshold value for an increase of the cumulative AE energy per 0.1 MPa is $50\times10^7$ (eU), i.e., the threshold value for the increasing rate of the cumulative AE energy is $5\times10^9$ (eU/MPa). Here, 1 (eU)=$10^{-14}$ ($V^2s$) as described later.

Figure 7:
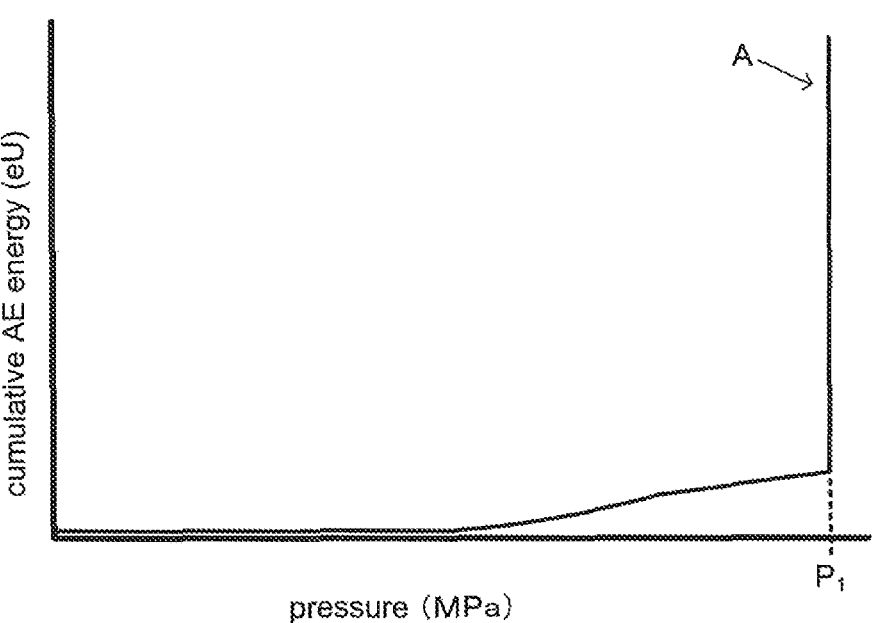
FIG. 7 shows the relation between the pressure and the cumulative AE energy according to an actual example.

FIG. 7 is a graph based on actual measurement results. In FIG. 7, the horizontal axis shows the pressure (MPa) in the high-pressure tank, and the vertical axis shows the cumulative AE energy (eU). As can be seen from this drawing, the cumulative AE energy (eU) rapidly increases at the pressure $P_1$. At this time, the increasing rate of the cumulative AE energy exceeded the threshold value for the first time. This $P_1$ is defined as a pressure just before the rupture.

2.2.1e. Step of Stopping Applying Pressure

In step S15 of stopping applying pressure (which may be referred to as "step S15"), the pressure application in the high-pressure tank is stopped if Yes is selected in step S14. After the pressure application is stopped, the pressure in the high-pressure tank may be gradually reduced, or may be maintained. Preferably, the pressure is reduced because the damage to the high-pressure tank is considered to be somewhat severe in step S15, and maintaining the pressure in this state highly likely causes the tank to rupture.

2.2.1f. Step of Estimating Burst Pressure

In step S16 of estimating a burst pressure (which may be referred to as "step S16"), the burst pressure of the high-pressure tank is estimated and information on the estimation is given. The burst pressure of the high-pressure tank is estimated based on the AE data when a burst test for high-pressure tanks was done in advance. Therefore, the pressure obtained by adding, to the pressure just before the rupture, a predetermined value based on the AE data when the burst test was done is defined as an estimated burst pressure. According to this embodiment, the difference between the pressure just before the rupture and the esti-mated burst pressure can be smaller. For example, the difference between the estimated burst pressure and the pressure just before the rupture can be at most 10 MPa. In the example shown in FIG. 7, actually, the high-pressure tank ruptures when the pressure of 5 MPa is applied to the pressure just before the rupture $P_1$.

The information is given through, for example, display on a monitor.

2.2.2. Embodiment 2

Figure 8:
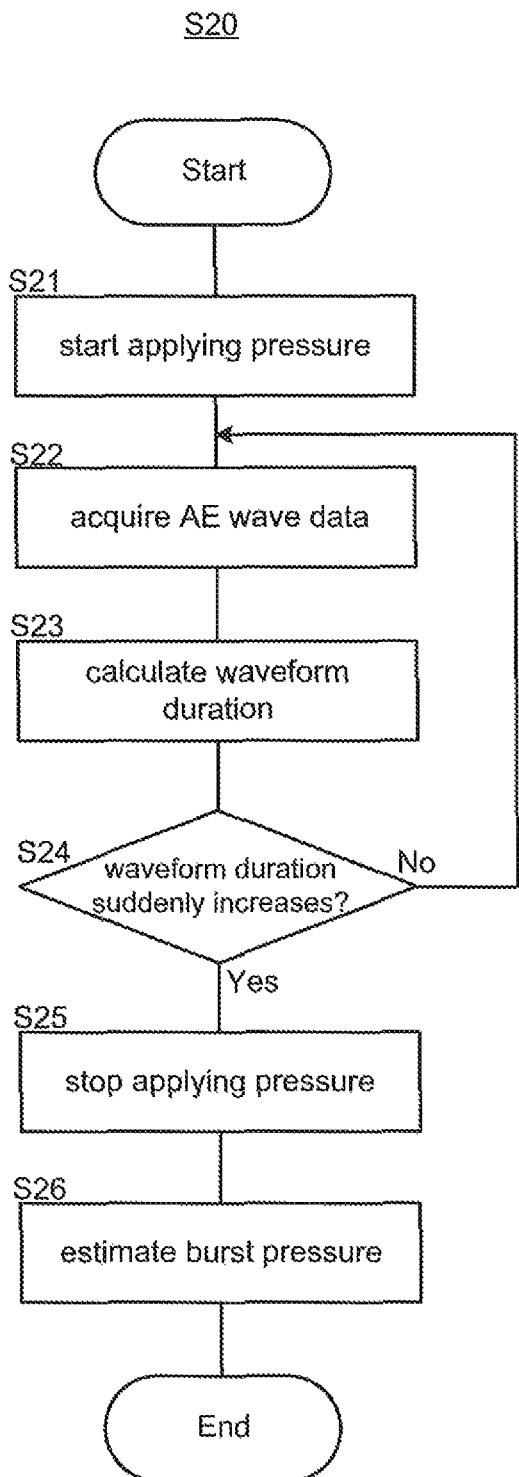
FIG. 8 illustrates an evaluation method S20.

FIG. 8 shows the flow of the method S20 of determining a tank to rupture according to embodiment 2. As can be seen from FIG. 8, the method S20 of determining a tank to rupture according to the present embodiment includes step S21 of starting applying pressure, step S22 of acquiring AE wave data, step S23 of calculating waveform duration, step S24 of determining whether the waveform duration rapidly increases, step S25 of stopping applying pressure, and step S26 of estimating a burst pressure. Hereinafter, each of the steps will be described.

2.2.2a. Step of Starting Applying Pressure

Step S21 of starting applying pressure (which may be referred to as "step S21") is the step of starting applying pressure to the inside of a high-pressure tank. Step S21 can be considered in the same way as step S11.

2.2.2b. Step of Acquiring AE Wave Data

In step S22 of acquiring AE wave data (which may be referred to as "step S22"), AE wave data is acquired from the high-pressure tank. Step S22 can be considered in the same way as step S12.

2.2.2c. Step of Calculating Waveform Duration

In step S23 of calculating waveform duration (which may be referred to as "step S23"), waveform duration is calcu-lated. The waveform duration is as known. In the process of increasing the pressure in a high-pressure tank, AE waves are generated intermittently. The waveform duration is the time for which the wave of amplitude that is over a certain setting value lasts. This setting value can be determined as needed. That is, while one AE wave is from the point over a setting value to the point under setting value for the set waveform separation time as described above, the waveform duration is the time from the point over a setting value to the point under the setting value by the waveform separation time on this one wave.

2.2.2d. Step of Determining whether Waveform Duration Rapidly Increases

In step S24 of determining whether the waveform dura-tion rapidly increases (which may be referred to as "step S24"), it is determined whether the waveform duration obtained in step S23 rapidly increases. If it is determined that the waveform duration rapidly increases in step S24, Yes is selected and the process proceeds to step S25 of stopping applying pressure. If it is determined that the waveform duration does not rapidly increase in step S24, the process returns to step S22 to proceed to acquire the AE wave data.

Figure 9:
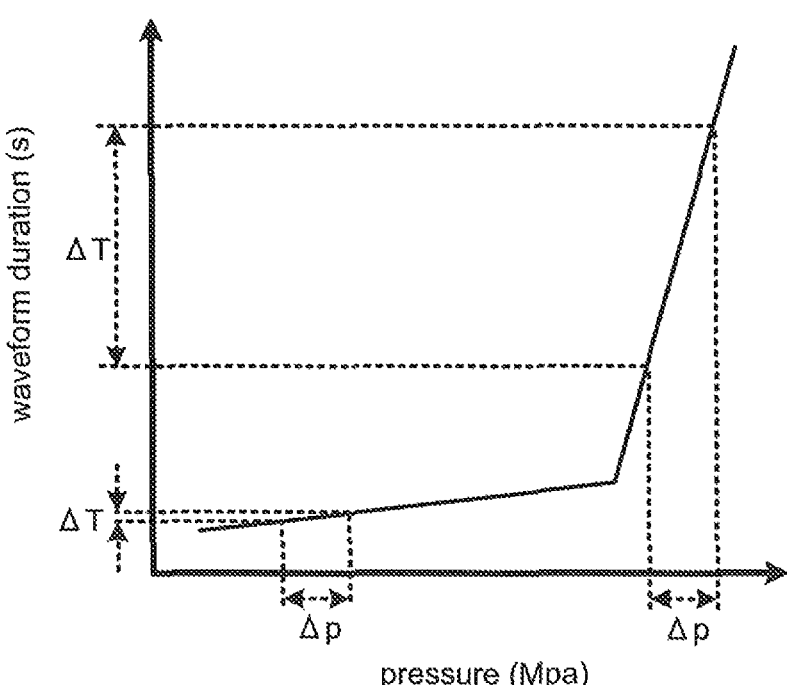
FIG. 9 illustrates the increasing rate of waveform duration.

Whether or not the waveform duration rapidly increases can be determined by whether the increasing rate ($\Delta T/\Delta p$) of the waveform duration, which is the ratio of the increase $\Delta T$ of the waveform duration to the increase $\Delta p$ of the pressure in the high-pressure tank, exceeds a threshold value as schematically shown in FIG. 9. A specific threshold value can be set as appropriate according to, for example, the structure of the high-pressure tank.

The pressure when the increasing rate exceeds the threshold value for the first time is defined as a pressure just before the rupture.

2.2.2e. Step of Stopping Applying Pressure

In step S25 of stopping applying pressure (which may be referred to as "step S25"), the pressure application in the high-pressure tank is stopped if Yes is selected in step S24. After the pressure application is stopped, the pressure in the high-pressure tank may be gradually reduced, or may be maintained. Preferably, the pressure is reduced because the damage to the high-pressure tank is considered to be somewhat severe in step S25, and maintaining the pressure in this state highly likely causes the tank to rupture.

2.2.2f. Step of Estimating Burst Pressure

In step S26 of estimating a burst pressure, the burst pressure of the high-pressure tank is estimated and information on the estimation is given. The burst pressure of the high-pressure tank is estimated based on the AE data when a burst test for high-pressure tanks was done in advance. Therefore, the pressure obtained by adding, to the pressure just before the rupture, a predetermined value based on the AE data when the burst test was done is defined as an estimated burst pressure. According to this embodiment, the difference between the pressure just before the rupture and the estimated burst pressure can be smaller. For example, the difference between the estimated burst pressure and the pressure just before the rupture can be at most 10 MPa.

The information is given through, for example, display on a monitor.

2.2.3. Embodiment 3

Figure 10:
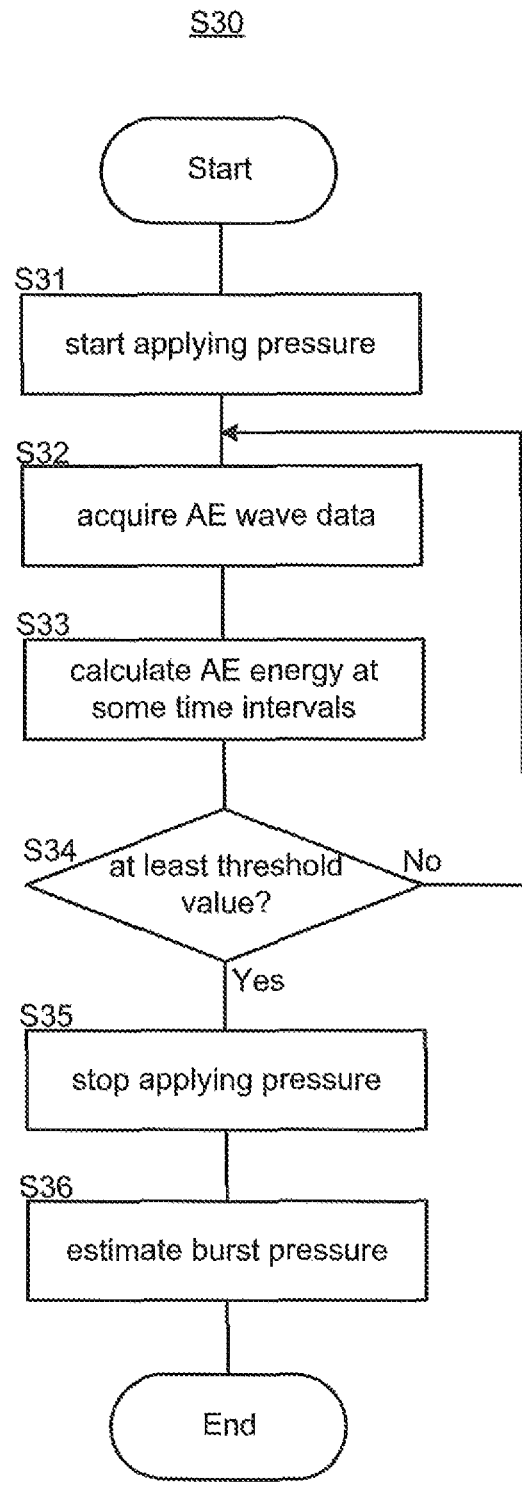
FIG. 10 illustrates an evaluation method S30.

FIG. 10 shows the flow of the method S30 of determining a tank to rupture according to embodiment 3. As can be seen from FIG. 10, the method S30 of determining a tank to rupture according to the present embodiment includes step S31 of starting applying pressure, step S32 of acquiring AE wave data, step S33 of calculating AE energy at some time intervals, step S34 of determining whether to be at least a threshold value, step S35 of stopping applying pressure, and step S36 of estimating a burst pressure. Hereinafter, each of the steps will be described.

2.2.3a. Step of Starting Applying Pressure Step S31 of starting applying pressure (which may be referred to as "step S31") is the step of starting applying pressure to the inside of a high-pressure tank. Step S31 can be considered in the same way as step S11.

2.2.3b. Step of Acquiring AE Wave Data

In step S32 of acquiring AE wave data (which may be referred to as "step S32"), AE wave data (signals) is acquired from the high-pressure tank. Step S32 can be considered in the same way as step S12.

2.2.3c. Step of Calculating AE Energy at Some Time Intervals

In step S33 of calculating AE energy at some time intervals (which may be referred to as "step S33"), the time integral of an AE wave every time is calculated. Here, the time integral of an AE wave every time is the time integral of the square of the signal of an AE wave. This is approximately the same as the product of the sampling interval and the square of the voltage level at any points of signals of the AE wave, and can be represented by $1 \text{ (eU)}=10^{-14} \text{ (V}^2\text{s)}$.

2.2.3d. Step of Determining Whether to be at Least Threshold Value

In step S34 of determining whether to be at least a threshold value (which may be referred to as "step S34"), it is determined whether the AE energy at some time intervals, which is obtained in step S33, is at least a threshold value. If it is determined that the AE energy at some time intervals is at least a threshold value in step S34, Yes is selected and the process proceeds to step S35 of stopping applying pressure. If it is determined that the AE energy at some time intervals is lower than the threshold value in step S34, the process returns to step S32 to proceed to acquire the AE wave data. The pressure when the AE energy is at least the threshold value for the first time is defined as a pressure just before the rupture.

Figure 11:
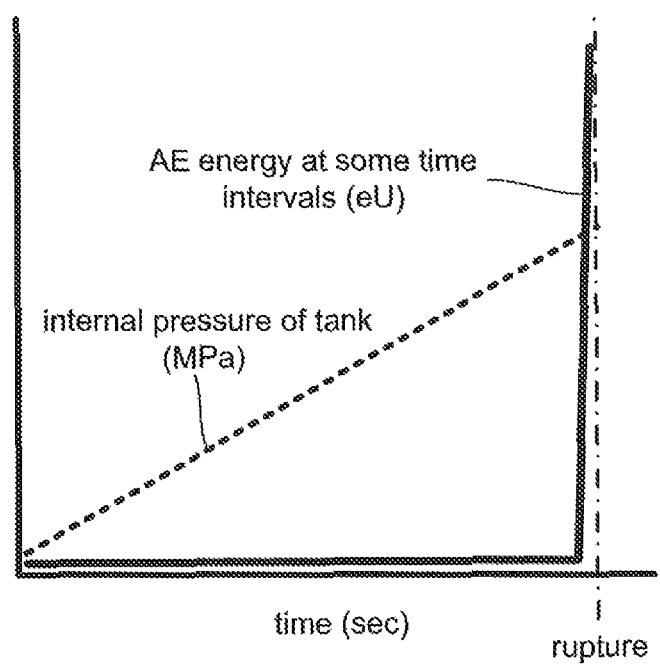
FIG. 11 illustrates the relation between the AE energy at some time intervals, and a rupture.
Figure 12A:
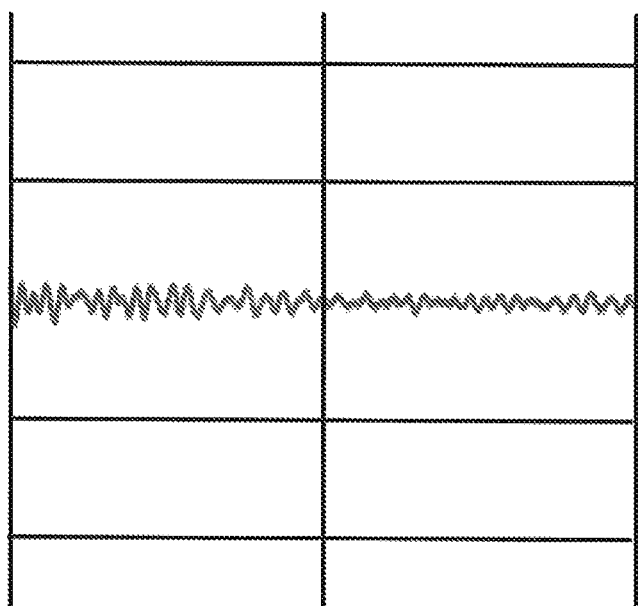
FIG. 12A shows an example of an AE waveform before the AE energy reaches a threshold value.
Figure 12B:
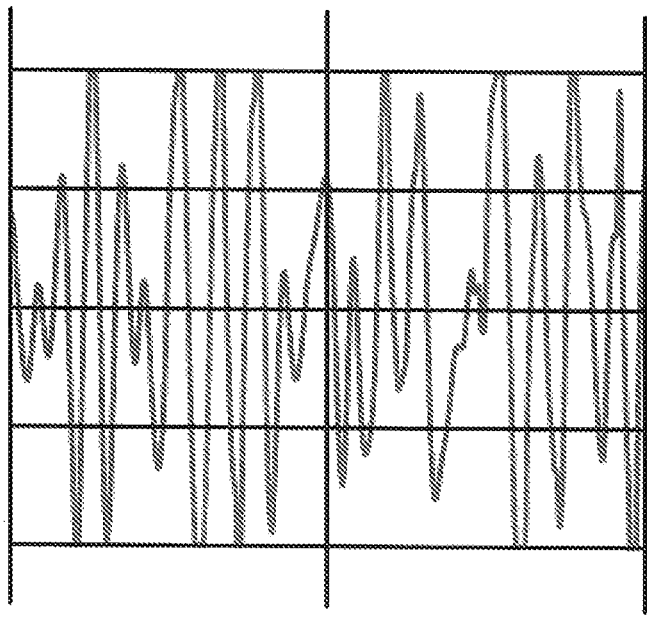
FIG. 12B shows an example of an AE waveform after the AE energy reaches the threshold value.

The inventor has found that the AE energy at some time intervals increases just before the rupture as shown in FIG. 11. FIG. 11 shows the change in the AE energy at some time intervals in the process of increasing the internal pressure of the high-pressure tank; the horizontal axis shows time. As can be seen in FIG. 11, it can be found that the AE energy at some time intervals rapidly increases just before the high-pressure tank ruptures. FIG. 12A shows part of the AE waveform which is before the AE energy reaches the threshold value, and FIG. 12B shows part of the AE waveform which is after the AE energy reaches the threshold value. As shown, it can be found that the AE waveform after the AE energy reaches the threshold value largely changes from that before the AE energy reaches the threshold value, and the amplitude thereafter is higher.

The threshold value in the determination on the AE energy at some time intervals varies depending on the size, structure, and type of the high-pressure tank. It is better to obtain the threshold value for each kind of tank in advance. The threshold value is not particularly limited. As a result of the inventor's research, irrespective of those size, structure, and type of the tank, the threshold value is $1 \times 10^8 \text{ (eU)}$ to $10 \times 10^8$ (eU), and is preferably $5 \times 10^8$ (eU). This leads to effects as described later. The AE energy at some time intervals which is obtained when the pressure in the tank is low (the AE energy is under the threshold value) is at most $1 \times 10^5$ (eU).

2.2.3e. Step of Stopping Applying Pressure

In step S35 of stopping applying pressure (which may be referred to as "step S35"), the pressure application in the high-pressure tank is stopped if Yes is selected in step S34. After the pressure application is stopped, the pressure in the high-pressure tank may be gradually reduced, or may be maintained. Preferably, the pressure is reduced because the damage to the high-pressure tank is considered to be somewhat severe in step S35, and maintaining the pressure in this state highly likely causes the tank to rupture.

2.2.3f. Step of Estimating Burst Pressure

In step S36 of estimating a burst pressure, the burst pressure of the high-pressure tank is estimated and information on the estimation is given. The burst pressure of the high-pressure tank is estimated based on the AE data when a burst test for high-pressure tanks was done in advance. Therefore, the pressure obtained by adding, to the pressure just before the rupture, a predetermined value based on the AE data when the burst test was done is defined as an estimated burst pressure. According to this embodiment, the difference between the pressure just before the rupture and the estimated burst pressure can be smaller. For example, the difference between the estimated burst pressure and the pressure just before the rupture can be at most 10 MPa.

The information is given through, for example, display on a monitor.

2.3. Effects Etc.

Any device or method according to these embodiments allows the burst pressure of a high-pressure tank to be estimated with high accuracy without the rupture of the high-pressure tank. According to the researches by the inventor etc., the magnitudes of other characteristic values of AE waves (such as AE counts, and the maximum amplitude) each have a large variety, and are each largely different between high-pressure tanks. Thus, it is difficult to improve the accuracy of the estimation of the burst pressure. According to any of these embodiments, the burst pressure of a high-pressure tank can be estimated with high accuracy without the rupture of the high-pressure tank, which makes it easy to observe a cross-section of the high-pressure tank just before the rupture, and to evaluate development while preventing the equipment from being damaged.

In embodiment 3, the determination is carried out with the time integral of an AE wave, which can shorten the time for the determination more than the determination after the cumulative value is obtained as in embodiment 1, and more than the determination after the duration is obtained in embodiment 2, so that a more accurate state just before the rupture can be obtained.

3. Evaluation by Sound 3.1. Evaluation Device

Figure 13:
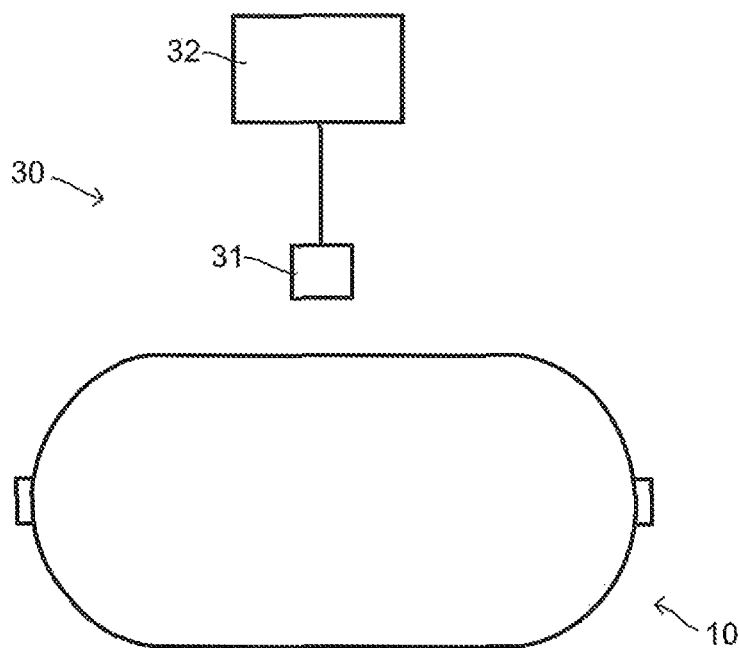
FIG. 13 illustrates the structure of an evaluation device 30.

An evaluation device 30 according to one example will be described with reference to drawings. FIG. 13 schematically shows the structure of the evaluation device 30 together with the high-pressure tank 10 to be evaluated. The evaluation device 30 is a device that detects the sign of the rupture of the high-pressure tank 10 following the increase in the internal pressure of the tank to give information on the sign before the rupture. Here, it is demanded that the evaluation device detect the sign before the rupture when the pressure is as close as possible to the pressure that causes the rupture. It is relatively easy to determine the tank to rupture on the safer side when the sign of the rupture is detected before the rupture. The determination on the rapture on too safer a side, however, prevents the relation between the rupture and the internal pressure of a high-pressure tank, including a fracture morphology, and the estimation of the burst pressure without the rupture, from being properly grasped. According to the present embodiment, the sign of the rupture can be detected before the rupture when the pressure is close to the pressure that causes the rupture (at most several megapascals lower than the burst pressure).

In the evaluation device 30, the sign of the rupture following the filling of the high-pressure tank 10 with a fluid (e.g., hydrogen) is detected by sound. The inventor has found that while the internal pressure of the high-pressure tank 10 is increasing, a characteristic sound is produced just before the rupture of the tank. The findings are used for detecting the sign of the rupture.

Therefore, the evaluation device 30 includes a sound collector 31 that detects the sound produced from the high-pressure tank 10 to be evaluated, and an arithmetic unit 32 that acquires data (digital signals) obtained in the sound collector 31 to determine whether the rupture will be caused.

3.1.1. Sound Collector

The sound collector 31 is a sensor that collects the sound emitted from the high-pressure tank 10. A known sound collector can be used as the sound collector 31. An example of the sound collector 31 is a highly directional microphone.

The number and arrangement of the sound collector 31 are not particularly limited as long as the sound produced in the high-pressure tank 10 can be effectively detected, and the position necessary therefor is applied. For example, when the size of the high-pressure tank 10 in the axial direction is defined as the total length, one sound collector is arranged at a position 200 mm away from the surface of the tank at the center of the total length. The number and arrangement of the sound collector 31 are not limited to this as described above, and can be appropriately set according to the conditions.

3.1.2. Arithmetic Unit

The arithmetic unit 32 carries out operations on the digital data on the sound detected at the sound collector 31 to determine the sign of the rupture. A specific aspect of the arithmetic unit 32 can be considered in the same way as the arithmetic unit 22, but, instead of the AE sensor 21, the sound collector 31 is connected to the reception unit 22*d* so as to be able to communicate. The obtained sound is evaluated as described later.

3.2. Determination on Rupture

Next, a specific method of determining the tank to rupture will be described. In the following embodiments, the tank is determined to rupture by processing, in the arithmetic unit 32, the sound data acquired at the sound collector 31 as described above. Thus, here, methods of determining the tank to rupture will be described. For the specific execution of these methods, the computer programs having steps corresponding to respective steps of the methods are created, recorded in the ROM 22*c* of the arithmetic unit 32 and the optional record medium, and executed; thereby, the tank can be determined to rupture. Hereinafter the methods of determining the tank to rupture according to embodiment 4 will be described. As described above, the computer programs based on any of them are recorded in the ROM 22*c* of the arithmetic unit 32 and the optional record medium, and thereby, function as one component of the evaluation device 30.

Figure 14:
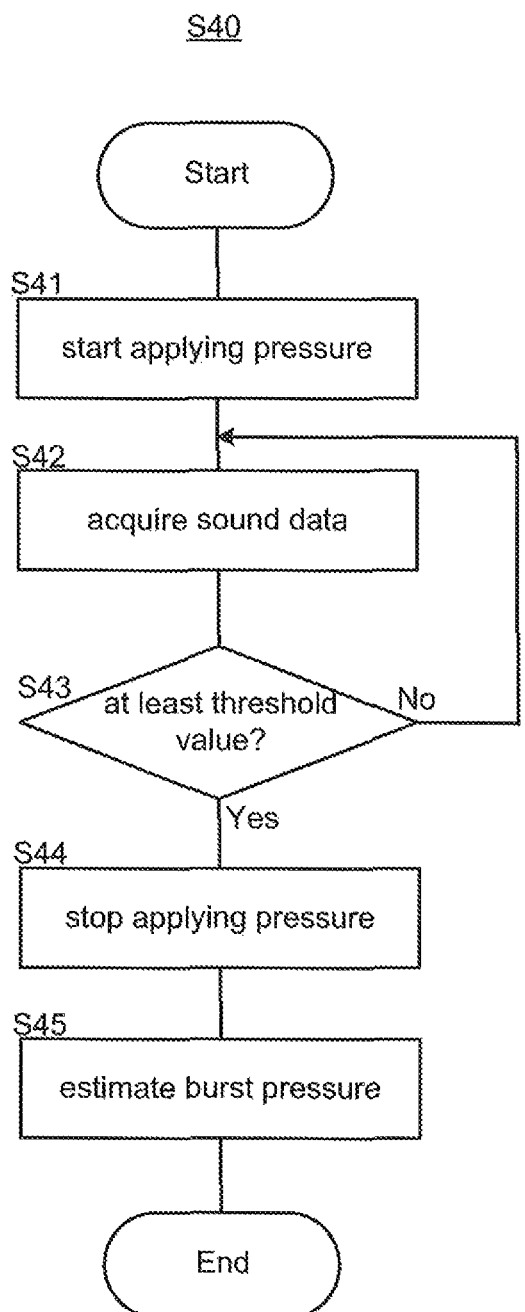
FIG. 14 illustrates an evaluation method S40.

FIG. 14 shows the flow of the method S40 of determining a tank to rupture according to embodiment 4. As can be seen from FIG. 14, the method S40 of determining a tank to rupture according to the present embodiment includes step S41 of starting applying pressure, step S42 of acquiring sound data, step S43 of determining whether to be at least a threshold value, step S44 of stopping applying pressure, and step S45 of estimating a burst pressure. Hereinafter, each of the steps will be described.

3.2.1 Step of Starting Applying Pressure

Step S41 of starting applying pressure (which may be referred to as "step S41") is the step of starting applying pressure to the inside of a high-pressure tank, and can be considered in the same way as step S11 of starting applying pressure.

3.2.2. Step of Acquiring Sound Data

In step S42 of acquiring sound data (which may be referred to as "step S42"), the data on the sound emitted from the high-pressure tank is acquired. Specifically, when the evaluation device 30 is used, step S42 is performed by acquiring sound data by the arithmetic unit 32 from the sound collector 31 disposed over the high-pressure tank 10. Here, the intervals at which the sound is acquired are not particularly limited. For example, the sound data can be acquired at a sampling rate of approximately 40 MHz.

3.2.3. Step of Determining Whether to be at Least Threshold Value

In step S43 of determining whether to be at least a threshold value (which may be referred to as "step S43"), it is determined whether the sound obtained in step S42 is at least a threshold value. If it is determined that the sound is at least a threshold value in step S43, Yes is selected and the process proceeds to step S44 of stopping applying pressure. If it is determined that the sound is lower than the threshold value in step S43, the process returns to step S42 to proceed to acquire the sound data. The pressure when the sound is at least the threshold value for the first time is defined as a pressure just before the rupture.

Figure 15:
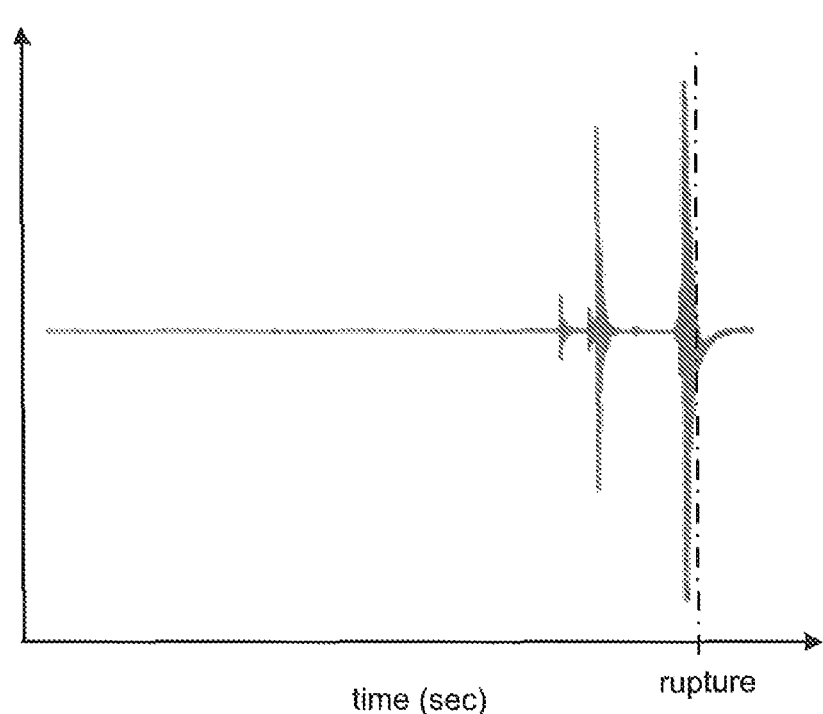
FIG. 15 shows the amplitude of the sound detected over time.

The inventor has found that the AE energy at some time intervals increases just before the rupture as described in embodiment 3, and has also found that a characteristic sound is produced at this time. This sound can be sensed even by human audition, and is a high-pitched sound (sound like a clang). Thus, as a result of his extensive research, the inventor has found out that a sound of different frequency and/or amplitude than before is produced just before the rupture. FIG. 15 shows the waveform of the sound; the horizontal axis shows time (seconds). As can be seen in FIG. 15, the amplitude of the sound increases just before the rupture. It was also found that the frequency just before the rupture increases.

The threshold value of the sound varies depending on the size, structure, and type of the high-pressure tank, and the arrangement of the sound collector. It is better to obtain the threshold value in advance according to the conditions. The threshold value is not particularly limited. As a result of the inventor's research, irrespective of those conditions, the threshold value in terms of the amplitude can be $3\times10^4$, and the threshold value in terms of the frequency band can be 15 kHz. When the pressure in the high-pressure tank is low, the obtained amplitude is $3\times10^2$, and the frequency band is lower than 15 kHz.

3.2.4. Step of Stopping Applying Pressure

In step S44 of stopping applying pressure (which may be referred to as "step S44"), the pressure application in the high-pressure tank is stopped if Yes is selected in step S43. After the pressure application is stopped, the pressure in the high-pressure tank may be gradually reduced, or may be maintained. Preferably, the pressure is reduced because the damage to the high-pressure tank is considered to be somewhat severe in step S44, and maintaining the pressure in this state highly likely causes the tank to rupture.

3.2.5. Step of Estimating Burst Pressure

In step S45 of estimating a burst pressure, the burst pressure of the high-pressure tank is estimated and information on the estimation is given. The burst pressure of the high-pressure tank is estimated based on the sound data when a burst test for high-pressure tanks was done in advance. Therefore, the pressure obtained by adding, to the pressure just before the rupture, a predetermined value based on the sound data when the burst test was done is defined as an estimated burst pressure. According to this embodiment, the difference between the pressure just before the rupture and the estimated burst pressure can be smaller. For example, the difference between the estimated burst pressure and the pressure just before the rupture can be at most 10 MPa.

The information is given through, for example, display on a monitor.

3.3. Effects Etc.

Any device or method according to this embodiment allows the burst pressure of a high-pressure tank to be estimated with high accuracy without the rupture of the high-pressure tank. According to the researches by the inventor etc., the magnitudes of other characteristic values of AE waves (such as AE counts, and the maximum amplitude) each have a large variety, and are each largely different between high-pressure tanks. Thus, it is difficult to improve the accuracy of the estimation of the burst pressure. According to the present embodiment, the burst pressure of a high-pressure tank can be estimated with high accuracy without the rupture of the high-pressure tank, which makes it easy to observe a cross-section of the high-pressure tank just before the rupture, and to evaluate development while preventing the equipment from being damaged.

The present embodiment is also useful when the sign of the rupture is simply detected in a case where, for example, any measurement equipment using AE is not provided.

REFERENCE SIGNS LIST

10 high-pressure tank
11 liner
12 stiffener layer
13 protective layer
14 mouthpiece
20 evaluation device
21 AE sensor
22 arithmetic unit
30 evaluation device
31 sound collector
32 arithmetic unit

What is claimed is:

1. A method of evaluating a tank, the method comprising:
measuring acoustic emission or sound while applying pressure to the tank; and
obtaining a pressure just before a rupture based on the measured acoustic emission or sound, wherein
the pressure just before the rupture is
a pressure when an increasing rate of waveform duration is at least a threshold value, the waveform duration being obtained by the measured acoustic emission.

2. The method according to claim 1, wherein
a pressure obtained by adding a predetermined value to the pressure just before the rupture is defined as an estimated burst pressure.

3. An evaluation device for a tank, the evaluation device comprising:
an acoustic emission sensor arranged on the tank; and
an arithmetic unit acquiring acoustic emission data from the acoustic emission sensor to carry out an operation, wherein
waveform duration based on the acoustic emission data to carry out the operation such that a pressure when an increasing rate of the waveform duration is at least a certain value is defined as the pressure just before a rupture.

4. The evaluation device according to claim 3, wherein
in the arithmetic unit, a pressure obtained by adding a predetermined value to the pressure just before the rupture is defined as an estimated burst pressure.

* * * * *